US012055272B2

(12) United States Patent
Light

(10) Patent No.: US 12,055,272 B2
(45) Date of Patent: Aug. 6, 2024

(54) METHOD FOR FILLING LIQUID CRYOGEN TRAILERS

(71) Applicant: L'Air Liquide, Societe Anonyme Pour L'Etude Et L'Exploitation Des Procedes Georges Claude, Paris (FR)

(72) Inventor: Joshua Light, Houston, TX (US)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 108 days.

(21) Appl. No.: 17/956,623

(22) Filed: Sep. 29, 2022

(65) Prior Publication Data

US 2024/0110670 A1 Apr. 4, 2024

(51) Int. Cl.
*F17C 5/00* (2006.01)
*F17C 5/02* (2006.01)

(52) U.S. Cl.
CPC ................ *F17C 5/007* (2013.01); *F17C 5/02* (2013.01); *F17C 2205/0142* (2013.01); *F17C 2221/012* (2013.01); *F17C 2223/0161* (2013.01); *F17C 2223/033* (2013.01); *F17C 2227/043* (2013.01); *F17C 2265/061* (2013.01); *F17C 2270/0171* (2013.01)

(58) Field of Classification Search
CPC .... F17C 5/007; F17C 5/02; F17C 2205/0142; F17C 2221/012; F17C 2223/0161; F17C 2223/033; F17C 2227/043; F17C 2265/061; F17C 2270/0171
USPC .............................................................. 141/5
See application file for complete search history.

(56) References Cited

U.S. PATENT DOCUMENTS 2,975,604 A 3/1961 McMahon
2006/0156742 A1 7/2006 Farese et al.
2023/0160533 A1* 5/2023 Demolliens ............ F25J 1/0244 141/1

FOREIGN PATENT DOCUMENTS

FR 3110670 A1 * 11/2021 ................ F17C 5/02

OTHER PUBLICATIONS

FR 3110670 A1-English Translation (Year: 2021).*
Petitpas, G., "Boil-off losses along LH2 pathway," Technical Report: LLNL-TR-750685, Lawrence Livermore National Laboratory, Livermore CA, May 2, 2018, 63 pgs.

* cited by examiner

*Primary Examiner* — Timothy P. Kelly
*Assistant Examiner* — Christopher M Afful
(74) *Attorney, Agent, or Firm* — Justin K. Murray

(57) ABSTRACT

At a liquid cryogen depot, gaseous cryogen from non-completely filled short trailers is used for pressurizing jumbo trailers, from which liquid cryogen is caused to flow into empty trailers through pressure differential.

11 Claims, 6 Drawing Sheets

METHOD FOR FILLING LIQUID CRYOGEN TRAILERS

CROSS-REFERENCE TO RELATED APPLICATIONS

None.

BACKGROUND

Field of the Invention

The present invention relates to an optimized method of distribution of liquid cryogen between a liquefied cryogen depot and end users.

Related Art

Liquid cryogen, such as hydrogen, is produced and stored by a number of means, but generally the liquid hydrogen is stored in a cryogenic storage tank on or near the source of hydrogen liquefaction (i.e., the liquefier) and often also the original hydrogen source, such as an electrolyzer. Liquid Hydrogen is transferred from this cryogenic storage container to cryogenic tube trailers transported by semi-trucks to sites remote from the liquefier, such as a hydrogen filling station for fuel cell electric vehicles (FCEVs).

At the remote site, the liquid hydrogen is transferred, by pressure difference, from the tube trailer through a hose to the end user storage tank by pressure difference. Because the pressure within the tube trailer is limited by regulatory authorities for purposes of safety, the initial pressure in the tube trailer at the remote site is typically much less than the pressure of the end user tank. For this reason, pressure must be built up in the tube trailer, according to conventional techniques, to a level sufficient to drive the liquid hydrogen from the tube trailer into the end user tank. The transfer of liquid hydrogen then proceeds until the pressures within the tube trailer and the end user tank are more or less equalized.

Because a substantial amount of the final cost of liquid hydrogen is made up of transportation costs, between the liquefier and the remote sites, it would be desirable to reduce those transportation costs. One way of doing so is to use so-called jumbo trailers whose liquid hydrogen storage capacity substantially exceeds that of tube trailers. While the use of jumbo trailers may be advantageous, regulatory authorities may restrict their use in more densely populated areas for safety reasons.

Regardless of whether a tube trailer or jumbo trailer is used, if enough liquid hydrogen remains within the trailer after an initial fill, subsequent fills of other end user tanks at other remote sites may be performed. Once the tube trailer or jumbo trailer is sufficiently depleted of liquid hydrogen, it is returned to the liquefier so that it may be filled again for continued deliveries to remote sites.

Before a refill, and depending upon the cost of hydrogen vs the cost for compressing hydrogen, gaseous hydrogen within the trailer may vented to a location within the liquefaction process, typically until the pressure within the trailer reaches 2-4 psig. G. Petipas, "*Boil-off losses along LH2 pathway*", Lawrence Livermore National Laboratory, LLNL-TR-750685, May 2, 2018. Depending upon the relative costs of cooling, compression, and hydrogen product, the hydrogen may instead be vented to the ambient. This is because the hydrogen remaining in the trailer upon return to the liquefier may be relatively warm and/or relatively low pressure, and thus make it difficult to take thermodynamic advantage of the pressure and/or cold energy of the remaining hydrogen when introducing it into the liquefaction process.

Given the above, it would be advantageous to provide an improved method for distribution of liquid hydrogen to one or more end user sites that lowers the cost of transporting it and avoids wastage.

SUMMARY

There is disclosed a method of distributing liquid cryogen to one or more end user sites. It includes the following steps. First, second, and third liquid cryogen-containing trailers are provided. Storage capacities of the first and third trailers are substantially the same and smaller than that of the second trailer. Each of the trailers has a headspace filled with cryogen vapor above the liquid cryogen contained therein. Each of the trailers is located at a depot at which the first trailer is at an initial pressure higher than an initial pressure of the second trailer which is higher than an initial pressure of the third trailer. Headspaces of the first and second trailers are placed in flow communication, thereby pressure-balancing the first and second trailers to a pressure P1 that is in between the initial pressures of the first and second trailers and that is higher than the initial pressure of the third trailer. Following the pressure-balancing of the first and second trailers, the liquid cryogen contained within the second trailer is placed in flow communication with the liquid cryogen contained within the third trailer, thereby causing liquid cryogen to flow from the second trailer to the third trailer due to the pressure difference between the pressure P1 of the first and second trailers and the initial pressure of the third trailer. The flow of liquid cryogen between the second and third trailers is allowed to continue until the third trailer is substantially filled with liquid cryogen and the first and second trailers are each at a pressure P2.

The method may include one or more of the following aspects:

- prior to the step of providing first, second, and third liquid cryogen-containing trailers, the first trailer is transported to an end user site A at which liquid cryogen is transferred from the first trailer to a storage tank at end user site A; and following the transfer of liquid cryogen to the end user site A, the first trailer is transported to the depot at which are located the second and third trailers, wherein, at the depot, the first trailer is at an initial pressure higher than an initial pressure of the second trailer which is higher than an initial pressure of the third trailer.
- after the step of allowing said flow of liquid cryogen between the second and third trailers to continue until the third trailer is substantially filled, the third trailer is transported to an end user site B at which liquid cryogen is transferred from the third trailer to a storage tank at end user site B which is the same or different from end user site A.
- after the step of allowing the flow of liquid cryogen between the second and third trailers to continue until the third trailer is substantially filled, gaseous cryogen is vented from the first trailer, thereby lowering a pressure of the first trailer down to a predetermined pressure lower than P2; a fourth liquid cryogen-containing trailer is provided having a storage capacity substantially the same as the first and third trailers, the fourth trailer being located at the depot at an initial pressure and having a headspace filled with cryogen vapor above the liquid cryogen contained therein, the initial pressure of the fourth trailer being higher than P2 which is higher than the predetermined pressure of the first trailer; headspaces of the fourth and second trailers are placed in flow communication, thereby pressure-balancing the fourth and second trailers to an intermediate pressure in between P2 and the initial pressure of the fourth trailer, the intermediate pressure of the fourth and second trailers being higher than the predetermined pressure of the first trailer; following the pressure-balancing of the fourth and second trailers, the liquid cryogen contained within the second trailer is placed in flow communication with the liquid cryogen contained within the first trailer, thereby causing liquid cryogen to flow from the second trailer to the third trailer due to the pressure difference between the intermediate pressure of the first and second trailers and the predetermined pressure of the first trailer; and the flow of liquid cryogen between the second and first trailers is allowed to continue until the first trailer is substantially filled with liquid cryogen.

the first trailer is transported to an end user site C at which liquid cryogen is transferred from the first trailer to a storage tank at end user site C, end user site C being the same or different than end user site A and the same or different than end user site B, wherein the second and fourth trailers are the same or different trailers.

after the step of allowing said flow of liquid cryogen between the second and third trailers to continue until the third trailer is substantially filled, gaseous cryogen is vented from the first trailer, thereby lowering a pressure of the first trailer down to a predetermined pressure lower than P2; a fourth liquid cryogen-containing trailer is provided having a storage capacity substantially the same as the first and third trailers, the fourth trailer being located at the depot at an initial pressure and having a headspace filled with cryogen vapor above the liquid cryogen contained therein, the initial pressure of the fourth trailer being higher than P2 which is higher than the predetermined pressure of the first trailer; headspaces of the fourth and second trailers are placed in flow communication, thereby pressure-balancing the fourth and second trailers to an intermediate pressure in between P2 and the initial pressure of the fourth trailer, the intermediate pressure of the fourth and second trailers being higher than the predetermined pressure of the first trailer; following the pressure-balancing of the fourth and second trailers, the liquid cryogen contained within the second trailer is placed in flow communication with the liquid cryogen contained within the first trailer, thereby causing liquid cryogen to flow from the second trailer to the third trailer due to the pressure difference between the intermediate pressure of the first and second trailers and the predetermined pressure of the first trailer; and the flow of liquid cryogen between the second and first trailers is allowed to continue until the first trailer is substantially filled with liquid cryogen.

the first trailer is transported to an end user site C at which liquid cryogen is transferred from the first trailer to a storage tank at end user site C, end user site C being the same or different than end user site A and the same or different than end user site B, wherein the second and fourth trailers are the same or different trailers.

after the step of allowing said flow of liquid cryogen between the second and third trailers to continue until the third trailer is substantially filled, gaseous cryogen is vented from the first trailer, thereby lowering a pressure of the first trailer down to a predetermined pressure lower than P2; a fourth liquid cryogen-containing trailer is provided having a storage capacity substantially the same as the first and third trailers, the fourth trailer being located at the depot at an initial pressure and having a headspace filled with cryogen vapor above the liquid cryogen contained therein, the initial pressure of the fourth trailer being higher than P2 which is higher than the predetermined pressure of the first trailer; Headspaces of the fourth and second trailers are placed in flow communication, thereby pressure-balancing the fourth and second trailers to an intermediate pressure in between P2 and the initial pressure of the fourth trailer, the intermediate pressure of the fourth and second trailers being higher than the predetermined pressure of the first trailer; following the pressure-balancing of the fourth and second trailers, the liquid cryogen contained within the second trailer is placed in flow communication with the liquid cryogen contained within the first trailer, thereby causing liquid cryogen to flow from the second trailer to the third trailer due to the pressure difference between the intermediate pressure of the first and second trailers and the predetermined pressure of the first trailer; and the flow of liquid cryogen between the second and first trailers is allowed to continue until the first trailer is substantially filled with liquid cryogen.

the first trailer is transported to an end user site C at which liquid cryogen is transferred from the first trailer to a storage tank at end user site C, end user site C being the same or different than end user site A and the same or different than end user site B, wherein the second and fourth trailers are the same or different trailers.

after the step of allowing said flow of liquid cryogen between the second and third trailers to continue until the third trailer is substantially filled, the third trailer is transported to an end user site B at which liquid cryogen is transferred from the first trailer to a storage tank at end user site B which is the same or different from end user site A.

the cryogen is Hydrogen.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

The inventor has conceived of an optimized method for distributing liquid cryogen (such as nitrogen, argon, helium, or hydrogen) to one or more end user sites. The method utilizes at least three, often four (or even more), liquid cryogen-containing trailers and which includes steps performed at a liquid cryogen depot and steps performed at one or more end user sites.

One of the trailers, a so-called jumbo trailer, has a substantially larger storage capacity and is located at the depot. The other trailers are filled with liquid cryogen from the jumbo trailer at the depot and are transported to an end user site after being filled so that they can, in turn, fill a storage tank located at an end user site. The type of cryogen is not limited and includes Oxygen, Nitrogen, Argon, Helium, Krypton, Neon, and preferably Hydrogen.

After one of the other trailers is substantially depleted of liquid cryogen and cannot be used to fill an end user storage tank, it is returned to the depot. Because of heat leaks incurred between transport of one of the other trailers between the end user site and the depot and/or the necessity of boosting pressure within that trailer to effectuate a fill of the end user storage tank, an interior of the trailer returned to the depot may be at a relatively higher pressure. By pressure-balancing the returned trailer and the jumbo trailer, the relatively high pressure of the returned trailer is used to boost a pressure of the jumbo trailer. Subsequently, the pressure within the returned trailer and the pressure within the jumbo trailer is used to drive liquid cryogen from the jumbo trailer to another trailer, at a relatively lower pressure, to be filled.

In this manner, much of the pressurized gaseous cryogen remaining in a trailer after delivery of liquid cryogen to an end user site may be used during the fill of another trailer with liquid cryogen from the jumbo trailer. As a consequence, less cryogen is wasted.

A more detailed explanation of the method now follows.

Figure 1:
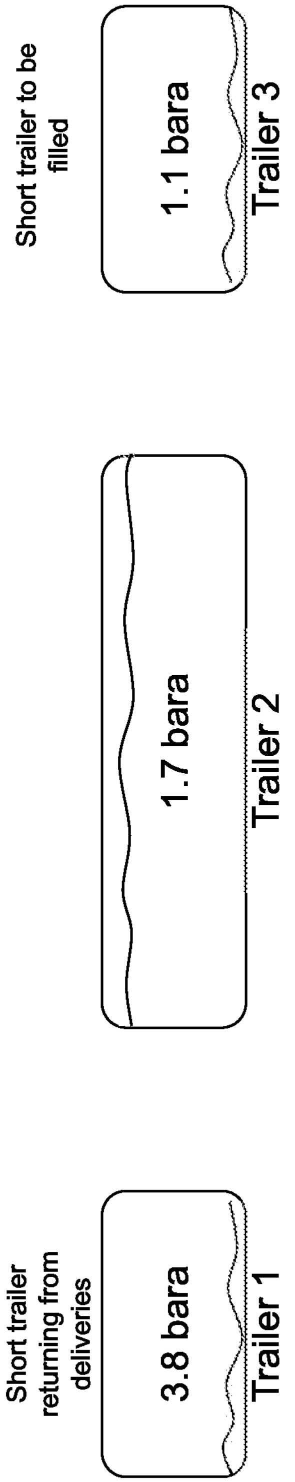
FIG. 1 is a schematic illustration of an initial state of a combination of three trailers, including a higher-pressure returned trailer, a jumbo trailer, and a lower-pressure trailer to be filled.

As shown in FIG. 1, after delivery of liquid cryogen to an end user site, called end user site A, and transport to a liquid cryogen depot, a liquid cryogen-containing tube trailer, called Trailer 1, contains a relatively lower amount of liquid cryogen and is at a relatively higher pressure, for example, 3.5-6 bara or about 3.8 bara. Also at the depot is another liquid cryogen-containing trailer, called Trailer 2. Trailer 2, commonly referred to in the field of liquefied gases as a so-called "jumbo trailer", has a liquid cryogen storage capacity higher than that of Trailer 1, which is commonly referred to as a "short trailer". For example, whereas the capacity of Trailer 1 typically ranges from –36 $m^3$, the capacity of Trailer 2 typically ranges from 75-80 $m^3$. Also at the depot is another liquid cryogen-containing trailer, called Trailer 3. Each of Trailer 1, Trailer, 2, and Trailer 3 has a headspace filled with cryogen vapor above the liquid cryogen contained therein. At the depot, Trailer 1 is at an initial pressure higher than an initial pressure of Trailer 2 which is higher than an initial pressure of Trailer 3. Trailers 1 and 3 have substantially the same capacity. This means that Trailer 1 and Trailer 3 have been designed to contain a same amount of liquid cryogen, even though minor differences in their storage capacities may be present.

Trailer 2 typically travels between a liquefaction plant, where the cryogen is liquefied, and the depot and is used as the primary means of filling short trailers, including Trailer 1 and Trailer 3. As will be seen below, Trailer 3 is typically a trailer that has previously served the role that Trailer 1 serves in the following description of FIGS. 1-7. Trailer 1 is at the depot because, after delivery of liquid cryogen to end user site A, Trailer 1 did not contain a sufficient amount of liquid cryogen for a practical amount of cryogen to be delivered to another end user site.

Figure 2:
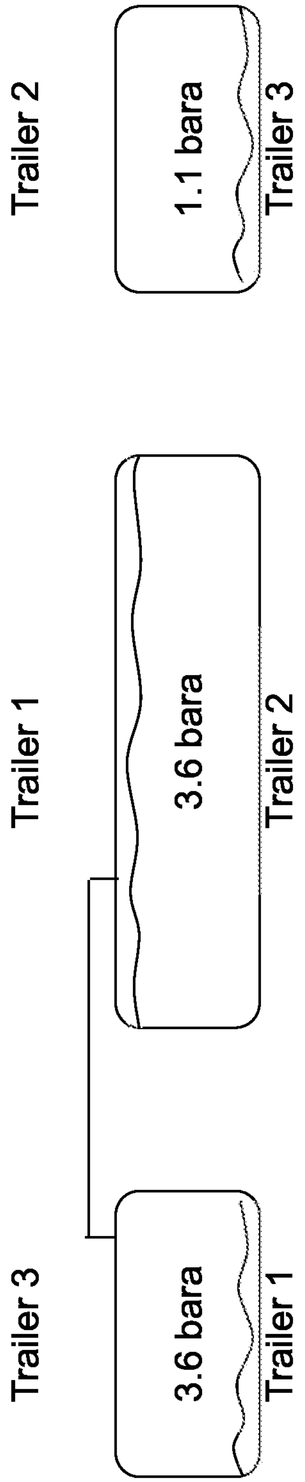
FIG. 2 is a schematic illustration of a step of pressure-balancing between the returned trailer and the jumbo trailer of FIG. 1.

As seen in FIG. 2, after connecting a port formed in Trailer 1, adjacent the headspace thereof, with a port formed in Trailer 2, adjacent the headspace thereof, using a suitable pipe/conduit, the headspaces of the Trailer 1 and Trailer 2 are placed in flow communication through operation of one or more valves associated with the pipe/conduit connecting the ports of Trailer 1 and Trailer 2. This causes Trailers 1 and 2 to become pressure balanced, and of course, it will result in their having a common pressure in between the initial pressures in Trailer 1 and Trailer 2 prior to being pressure-balanced. For example, if Trailer 1 is at 3.8 bara and Trailer 2 is at 1.7 bara prior to their being pressure-balanced, the pressure within Trailer 1 may decrease from 3.8 bara to 3.6 bara while the pressure within Trailer 2 may increase from 1.7 bara to 3.6 bara. This common pressure is also greater than a pressure within Trailer 3.

Figure 3:
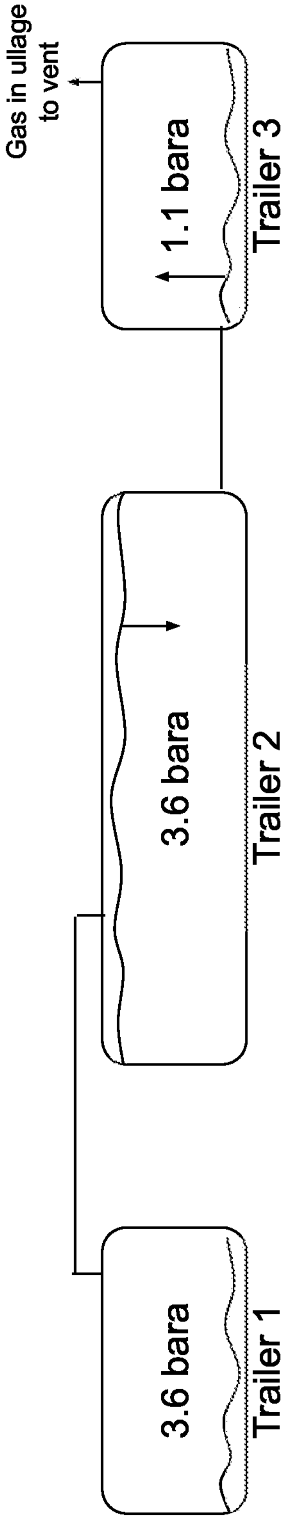
FIG. 3 is a schematic illustration of a step of transfer of liquid hydrogen from the jumbo trailer to the lower-pressure trailer of FIG. 2.

As seen in FIG. 3, a port formed in Trailer 2, adjacent a bottom thereof, is connected to a port formed in Trailer 3, adjacent a bottom thereof, using a suitable pipe/conduit, and Trailer 2, and Trailer 3 are placed in flow communication through operation of one or more valves associated with the pipe/conduit connecting the ports of Trailer 2 and Trailer 3. It should be noted that, at this time, the headspaces of Trailer 1 and Trailer 2 are in flow communication. This causes a flow of the liquid cryogen from Trailer 2 to Trailer 3, due to the pressure difference between, on one hand, the pressure within Trailer 1 and Trailer 2, and on the other hand, the pressure within Trailer 3. It should be noted that the gaseous cryogen within the headspace of Trailer 3 is allowed to vent, through operation of one or more valves associated with the headspace of Trailer 3, in order to maintain the pressure within Trailer 3 to remain, more or less, constant to allow the liquid cryogen to flow from Trailer 2 to Trailer 3 in a relatively unhindered manner and prevent a pressure increase in the Trailer 3. As the liquid cryogen flows from Trailer 2 into Trailer 3, there is space in Trailer 2 that needs to be filled with gaseous cryogen, and gaseous cryogen will continue to flow from Trailer 1 into Trailer 2.

Figure 4:
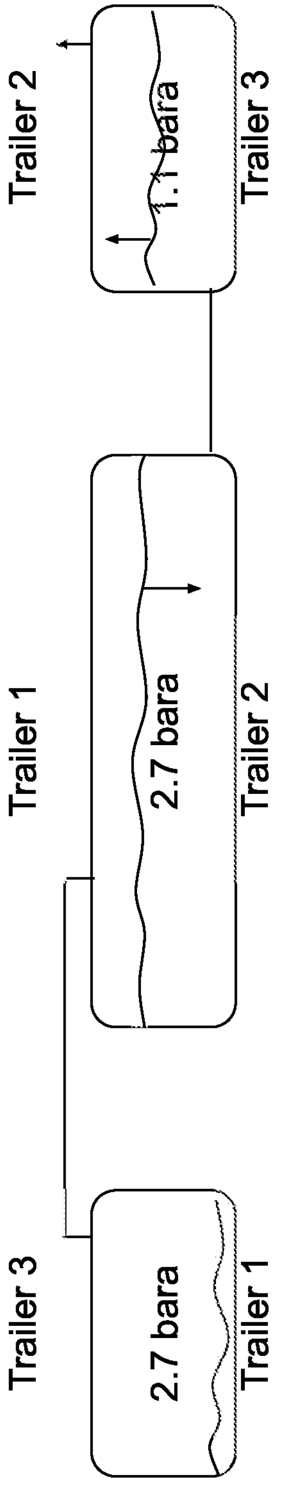
FIG. 4 is a schematic illustration of the continuation of the liquid hydrogen transfer step of FIG. 3.
Figure 5:
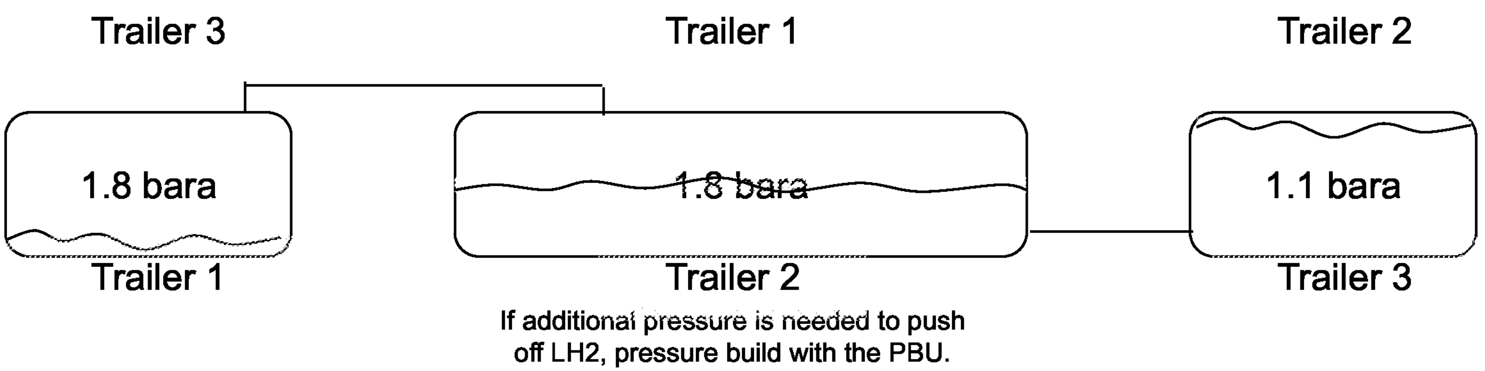
FIG. 5 is a schematic illustration of a conclusion of the liquid hydrogen transfer step of FIG. 4.

As seen in FIGS. 4-5, this transfer of liquid cryogen from Trailer 2 to Trailer 3 is allowed to continue until the third trailer is substantially filled with liquid cryogen and Trailer 1 and Trailer 2 are each at a pressure P2. If the pressure difference between, on one hand, Trailer 1 and Trailer 2, and on the other hand, Trailer 3 is not sufficient to allow Trailer 3 to be filled with liquid cryogen to a desired level, a pressure building circuit associated with Trailer 1, a pressure building circuit associated with Trailer 2, or each of the aforementioned pressure building circuits may be operated so as to increase the pressure within Trailer 1 and Trailer 2 that is sufficient to force enough liquid cryogen into Trailer 3. Typically, the flow of liquid cryogen continues until each of Trailer 1, Trailer 2, and Trailer 3 become pressure-balanced. Alternatively, it could continue until the amount of liquid cryogen within Trailer 3 reaches a desired level, as confirmed by any suitable technique in the field of industrial gases, such as a level sensor, or a weight scale. For example, if the pressure within Trailer 1 and Trailer 2 is at 3.6 bara and the pressure within Trailer 3 is 1.1 bara prior to operation of the one or more valves associated with the pipe/conduit connecting Trailer 2 and Trailer 3, after substantially filling Trailer 3 with liquid cryogen from Trailer 2, the pressure within Trailer 1 and Trailer 2 decreases from 3.6 bara to 2.7 bara and the pressure within Trailer 3 remains at 1.1 bara.

After being substantially filled, the one or more valves associated with the pipe/conduit connecting Trailer 2 and Trailer 3 is operated to disallow flow communication between Trailer 2 and Trailer 3. Also, venting of gaseous cryogen from the headspace of Trailer 3 is prevented by operating the one or more valves associated with the headspace of Trailer 3. Next, the pipe/conduit connecting Trailer 2 and Trailer 3 is disconnected. Trailer 3 is now able to be transported to an end user site B at which liquid cryogen is transferred from Trailer 3 to a storage tank at end user site B which is the same or different from end user site A.

Figure 6:
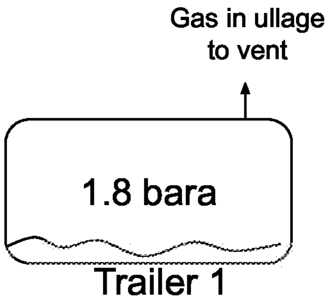
FIG. 6 is a schematic illustration of step of venting the returned trailers to lower its pressure.
Figure 7:
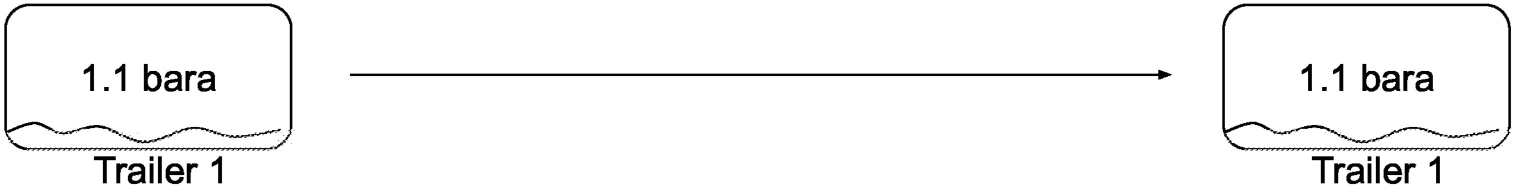
FIG. 7 is a schematic illustration of how the vented returned trailer becomes the lower-pressure to be filled.

Optionally and as seen in FIG. 6, the pressure within the headspace of Trailer 1 may be vented to a suitable level so as to allow it to be more easily filled, by pressure difference, with liquid cryogen from Trailer 2 in the same manner as described above for the filling of Trailer 3. For example, if Trailer 1 is at 1.8 bara after filling Trailer 3 with liquid cryogen from Trailer 2, the gaseous cryogen within the headspace of Trailer 1 may be vented until the pressure within Trailer 1 reaches 1.1 bara. This lowered pressure allows Trailer 1 to be filled with liquid cryogen, due to the aforementioned pressure difference, without necessarily using a pressure building circuit or without using a pressure building circuit to such a greater extent as compared to filling without venting beforehand.

Optionally and as seen in FIGS. 7-12, Trailer 1 assumes the role previously served by Trailer 3 and is substantially filled with liquid cryogen in a similar manner.

Figure 8:
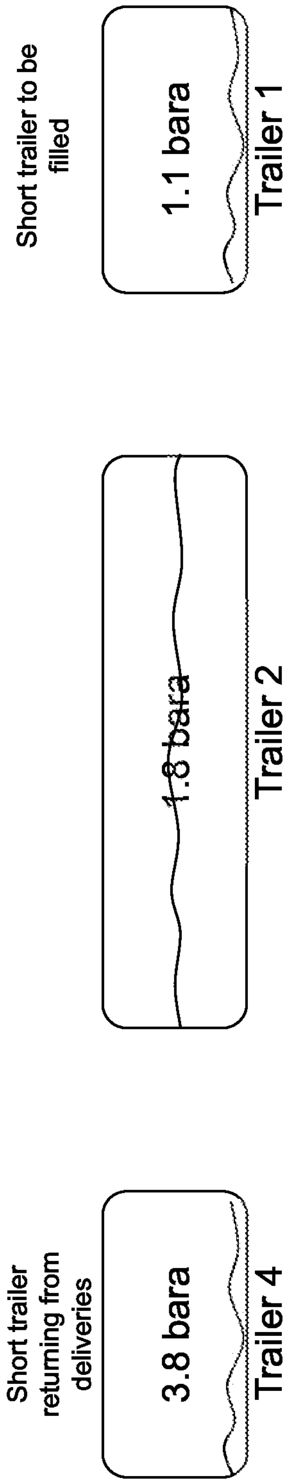
FIG. 8 is a schematic illustration of an initial state of a combination of a returned trailer and jumbo trailer of FIG. 5 and the now-lower-pressure returned trailer to be filled of FIG. 7.

As seen in FIG. 8, after delivery of liquid cryogen to an end user site, called end user site C (which may be the same as or different from site A and the same as or different from site B) and transport to the liquid cryogen depot, a liquid cryogen-containing tube trailer, called Trailer 4, contains a relatively lower amount of liquid cryogen and is at a relatively higher pressure, for example, 3.5-6 bara or about 3.8 bara. Also at the depot are Trailer 2 and Trailer 1. As with Trailer 2 and Trailer 1, Trailer 4 has a headspace filled with cryogen vapor above the liquid cryogen contained therein. At the depot, Trailer 4 is at an initial pressure higher than an initial pressure of Trailer 2 which is higher than an initial pressure of Trailer 1. Trailers 4 and 1 have substantially the same capacity. This means that Trailer 4 and Trailer 1 have been designed to contain a same amount of liquid cryogen, even though minor differences in their storage capacities may be present.

As seen above, Trailer 1 has previously served the role that Trailer 4 serves in the following description of FIGS. 8-12. Trailer 4 is at the depot because, after delivery of liquid cryogen to end user site C, Trailer 4 did not contain a sufficient amount of liquid cryogen for a practical amount of cryogen to be delivered to another end user site.

Figure 9:
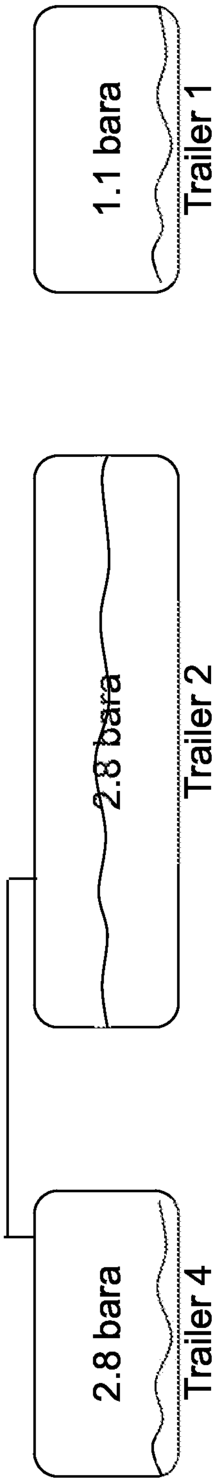
FIG. 9 is a schematic illustration of a step of pressure-balancing between the returned trailer and jumbo trailer of FIG. 8.

As seen in FIG. 9, after connecting a port formed in Trailer 4, adjacent the headspace thereof, with the port formed in Trailer 2, adjacent the headspace thereof, using a suitable pipe/conduit, the headspaces of the Trailer 4 and Trailer 2 are placed in flow communication through operation of one or more valves associated with the pipe/conduit connecting the ports of Trailer 4 and Trailer 2. This causes Trailers 4 and 2 to become pressure balanced, and of course, it will result in their having a common pressure in between the initial pressures in Trailer 4 and Trailer 2 prior to being pressure-balanced. For example, if Trailer 4 is at 3.8 bara and Trailer 2 is at 1.8 bara prior to their being pressure-balanced, the pressure within Trailer 4 may decrease from 3.8 bara to 2.8 bara while the pressure within Trailer 2 may increase from 1.8 bara to 2.8 bara. This common pressure is also greater than a pressure within Trailer 1.

Figure 10:
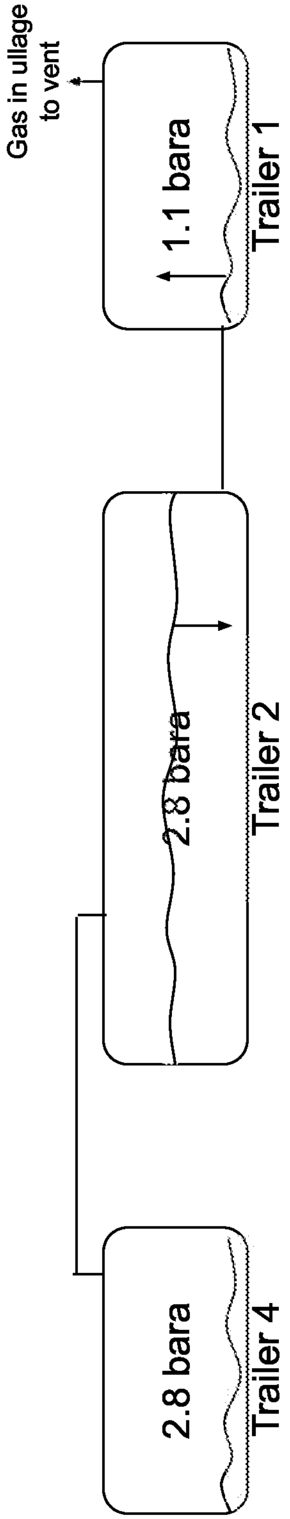
FIG. 10 is a schematic illustration of a step of transfer of liquid hydrogen from the jumbo trailer to the lower-pressure trailer of FIG. 9.

As seen in FIG. 10, the port formed in Trailer 2, adjacent a bottom thereof, is connected to a port formed in Trailer 1, adjacent a bottom thereof, using a suitable pipe/conduit and Trailer 2, and Trailer 1 are placed in flow communication through operation of one or more valves associated with the pipe/conduit connecting the ports of Trailer 2 and Trailer 1. It should be noted that, at this time, the headspaces of Trailer 4 and Trailer 2 are in flow communication. This causes a flow of the liquid cryogen from Trailer 2 to Trailer 1, due to the pressure difference between, on one hand, the pressure within Trailer 4 and Trailer 2, and on the other hand, the pressure within Trailer 1. It should be noted that the gaseous cryogen within the headspace of Trailer 1 is allowed to vent, through operation of one or more valves associated with the headspace of Trailer 1, to maintain the pressure within Trailer 1 to remain, more or less, constant to allow the liquid cryogen to flow from Trailer 2 to Trailer 1 in a relatively unhindered manner and prevent a pressure increase in the Trailer 1. As the liquid cryogen flows from Trailer 2 into Trailer 1, there is space in Trailer 2 that needs to be filled with gaseous cryogen, and gaseous cryogen will continue to flow from Trailer 4 into Trailer 2.

Figure 11:
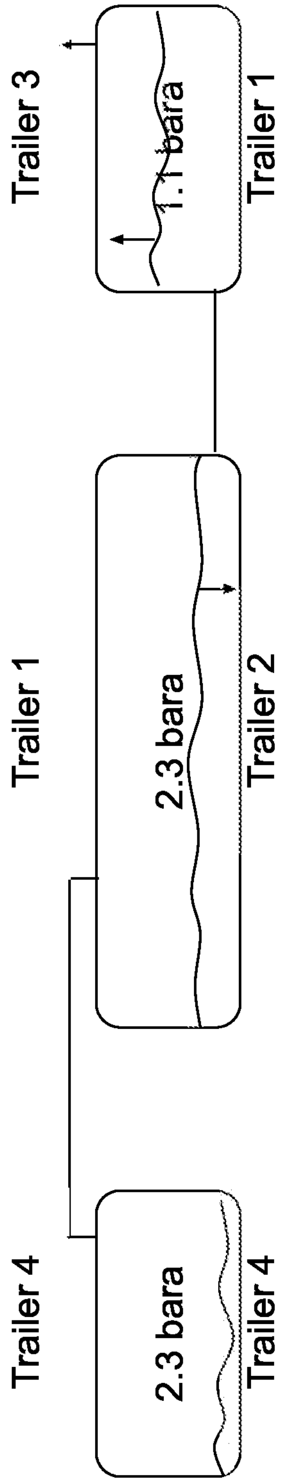
FIG. 11 is a schematic illustration of the continuation of the liquid hydrogen transfer step of FIG. 10.
Figure 12:
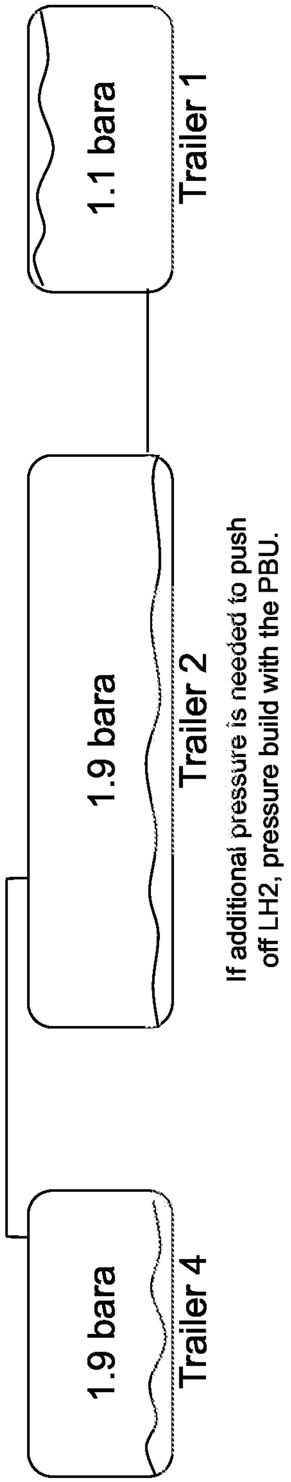
FIG. 12 is a schematic illustration of a conclusion of the liquid hydrogen transfer step of FIG. 11.

As seen in FIGS. 11-12, this transfer of liquid cryogen from Trailer 2 to Trailer 1 is allowed to continue until the third trailer is substantially filled with liquid cryogen and Trailer 4 and Trailer 2 are each at a pressure P2. If the pressure difference between, on one hand, Trailer 4 and Trailer 2, and on the other hand, Trailer 1 is not sufficient to allow Trailer 1 to be filled with liquid cryogen to a desired level, a pressure building circuit associated with Trailer 4, a pressure building circuit associated with Trailer 2, or each of the aforementioned pressure building circuits may be operated so as to increase the pressure within Trailer 4 and Trailer 2 that is sufficient to force enough liquid cryogen into Trailer 1. Typically, the flow of liquid cryogen continues until each of Trailer 4, Trailer 2, and Trailer 1 become pressure-balanced. Alternatively, it could continue until the amount of liquid cryogen within Trailer 1 reaches a desired level, as confirmed by any suitable technique in the field of industrial gases, such as a level sensor, or a weight scale. For example, if the pressure within Trailer 4 and Trailer 2 is at 2.8 bara and the pressure within Trailer 1 is 1.1 bara prior to operation of the one or more valves associated with the pipe/conduit connecting Trailer 2 and Trailer 1, after substantially filling Trailer 1 with liquid cryogen from Trailer 2, the pressure within Trailer 4 and Trailer 2 decreases from 2.8 bara to 2.3 bara and the pressure within Trailer 1 remains at 1.1 bara.

After being substantially filled, the one or more valves associated with the pipe/conduit connecting Trailer 2 and Trailer 1 is operated to disallow flow communication between Trailer 2 and Trailer 1. Also, venting of gaseous cryogen from the headspace of Trailer 1 is prevented by operating the one or more valves associated with the headspace of Trailer 1. Next, the pipe/conduit connecting Trailer 2 and Trailer 1 is disconnected. Trailer 1 is now able to be transported to an end user site D at which liquid cryogen is transferred from Trailer 3 to a storage tank at end user site D which is the same or different from end user site A, end user site B, and end user site C.

Optionally, one of ordinary skill will recognize that the above-mentioned method may be repeated as necessary where the initially higher-pressure trailer is vented to a suitable level so as to allow it to be more easily filled, by pressure difference, with liquid cryogen from Trailer 2.

EMBODIMENTS OF THE INVENTION PROVIDE MANY ADVANTAGES

In absence of the invention, the jumbo trailer needs to be pressurized in order to push liquid cryogen from the jumbo trailer to the short trailer. Skilled artisans will understand that, conventionally, this pressurization is created by vaporizing liquid cryogen in the jumbo trailer. In contrast, embodiments of the invention utilize gaseous cryogen from the short trailers for pressurization of the jumbo trailer. By avoiding vaporization of the liquid cryogen for pressurization, more cryogen (for example and in the case of cryogenic hydrogen, ~170 kg) is available to be transferred to the short trailers. Utilizing this liquid cryogen improves the efficiency of the supply chain and reduces losses because its heat content is lower in comparison to liquid cryogen filled into short trailers through conventional techniques. The supply chain efficiency is improved because the full amount of liquid cryogen is transferred at this step. Another way of looking at this is that the losses are reduced (using the aforementioned cryogenic hydrogen example, by ~170 kg). The gas in the short trailers will be vented, so capturing the gas to pressurize the jumbo trailer prevents the creation of an additional gas in the jumbo trailer that will have to be vented.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method of distributing liquid cryogen to one or more end user sites, comprising the steps of:

providing first, second, and third liquid cryogen-containing trailers, storage capacities of the first and third trailers being substantially the same and smaller than that of the second trailer, each of the trailers having a headspace filled with cryogen vapor above the liquid cryogen contained therein, each of the trailers being located at a depot at which the first trailer is at an initial pressure higher than an initial pressure of the second trailer which is higher than an initial pressure of the third trailer;

placing headspaces of the first and second trailers in flow communication, thereby pressure-balancing the first and second trailers to a pressure P1 that is in between the initial pressures of the first and second trailers and that is higher than the initial pressure of the third trailer;

following said pressure-balancing of the first and second trailers, placing the liquid cryogen contained within the second trailer in flow communication with the liquid cryogen contained within the third trailer, thereby causing liquid cryogen to flow from the second trailer to the third trailer due to the pressure difference between the pressure P1 of the first and second trailers and the initial pressure of the third trailer and allowing said flow of liquid cryogen between the second and third trailers to continue until the third trailer is substantially filled with liquid cryogen and the first and second trailers are each at a pressure P2.

2. The method of claim 1, further comprising the step of:

prior to said step of providing first, second, and third liquid cryogen-containing trailers, transporting the first trailer to an end user site A at which liquid cryogen is transferred from the first trailer to a storage tank at end user site A; and following said transfer of liquid cryogen to the end user site A, transporting the first trailer to the depot at which are located the second and third trailers, wherein, at the depot, the first trailer is at an initial pressure higher than an initial pressure of the second trailer which is higher than an initial pressure of the third trailer.

3. The method of claim 2, further comprising the step of, after said step of allowing said flow of liquid cryogen between the second and third trailers to continue until the third trailer is substantially filled, transporting the third trailer to an end user site B at which liquid cryogen is transferred from the third trailer to a storage tank at end user site B which is the same or different from end user site A.

4. The method of claim 3, further comprising the steps of:

after said step of allowing said flow of liquid cryogen between the second and third trailers to continue until the third trailer is substantially filled, venting gaseous cryogen from the first trailer to a predetermined pressure lower than P2;

providing a fourth liquid cryogen-containing trailer having a storage capacity substantially the same as the first and third trailers, the fourth trailer being located at the depot at an initial pressure and having a headspace filled with cryogen vapor above the liquid cryogen contained therein, the initial pressure of the fourth trailer being higher than P2 which is higher than the predetermined pressure of the first trailer;

placing headspaces of the fourth and second trailers in flow communication, thereby pressure-balancing the fourth and second trailers to an intermediate pressure in between P2 and the initial pressure of the fourth trailer, the intermediate pressure of the fourth and second trailers being higher than the predetermined pressure of the first trailer; and following said pressure-balancing of the fourth and second trailers, placing the liquid cryogen contained within the second trailer in flow communication with the liquid cryogen contained within the first trailer, thereby causing liquid cryogen to flow from the second trailer to the third trailer due to the pressure difference between the intermediate pressure of the first and second trailers and the predetermined pressure of the first trailer and allowing said flow of liquid cryogen between the second and first trailers to continue until the first trailer is substantially filled with liquid cryogen.

5. The method of claim 4, further comprising the step of transporting the first trailer to an end user site C at which liquid cryogen is transferred from the first trailer to a storage tank at end user site C, end user site C being the same or different than end user site A and the same or different than end user site B, wherein the second and fourth trailers are the same or different trailers.

6. The method of claim 2, further comprising the steps of:

after said step of allowing said flow of liquid cryogen between the second and third trailers to continue until the third trailer is substantially filled, venting gaseous cryogen from the first trailer to a predetermined pressure lower than P2;

providing a fourth liquid cryogen-containing trailer having a storage capacity substantially the same as the first and third trailers, the fourth trailer being located at the depot at an initial pressure and having a headspace filled with cryogen vapor above the liquid cryogen contained therein, the initial pressure of the fourth trailer being higher than P2 which is higher than the predetermined pressure of the first trailer;

placing headspaces of the fourth and second trailers in flow communication, thereby pressure-balancing the fourth and second trailers to an intermediate pressure in between P2 and the initial pressure of the fourth trailer, the intermediate pressure of the fourth and second trailers being higher than the predetermined pressure of the first trailer; and following said pressure-balancing of the fourth and second trailers, placing the liquid cryogen contained within the second trailer in flow communication with the liquid cryogen contained within the first trailer, thereby causing liquid cryogen to flow from the second trailer to the third trailer due to the pressure difference between the intermediate pressure of the first and second trailers and the predetermined pressure of the first trailer and allowing said flow of liquid cryogen between the second and first trailers to continue until the first trailer is substantially filled with liquid cryogen.

7. The method of claim 6, further comprising the step of transporting the first trailer to an end user site C at which liquid cryogen is transferred from the first trailer to a storage tank at end user site C, end user site C being the same or different than end user site A and the same or different than end user site B, wherein the second and fourth trailers are the same or different trailers.

8. The method of claim 1, further comprising the steps of:

after said step of allowing said flow of liquid cryogen between the second and third trailers to continue until the third trailer is substantially filled, venting gaseous cryogen from the first trailer to a predetermined pressure lower than P2;

providing a fourth liquid cryogen-containing trailer having a storage capacity substantially the same as the first and third trailers, the fourth trailer being located at the depot at an initial pressure and having a headspace filled with cryogen vapor above the liquid cryogen contained therein, the initial pressure of the fourth trailer being higher than P2 which is higher than the predetermined pressure of the first trailer;

placing headspaces of the fourth and second trailers in flow communication, thereby pressure-balancing the fourth and second trailers to an intermediate pressure in between P2 and the initial pressure of the fourth trailer, the intermediate pressure of the fourth and second trailers being higher than the predetermined pressure of the first trailer; and following said pressure-balancing of the fourth and second trailers, placing the liquid cryogen contained within the second trailer in flow communication with the liquid cryogen contained within the first trailer, thereby causing liquid cryogen to flow from the second trailer to the third trailer due to the pressure difference between the intermediate pressure of the first and second trailers and the predetermined pressure of the first trailer and allowing said flow of liquid cryogen between the second and first trailers to continue until the first trailer is substantially filled with liquid cryogen.

9. The method of claim 8, further comprising the step of transporting the first trailer to an end user site C at which liquid cryogen is transferred from the first trailer to a storage tank at end user site C, end user site C being the same or different than end user site A and the same or different than end user site B, wherein the second and fourth trailers are the same or different trailers.

10. The method of claim 9, further comprising the step of, after said step of allowing said flow of liquid cryogen between the second and third trailers to continue until the third trailer is substantially filled, transporting the third trailer to an end user site B at which liquid cryogen is transferred from the first trailer to a storage tank at end user site B which is the same or different from end user site A.

11. The method of claim 1, wherein the cryogen is Hydrogen.

* * * * *